United States Patent
Nakakusu

(10) Patent No.: US 9,100,566 B2
(45) Date of Patent: Aug. 4, 2015

(54) IMAGING APPARATUS AND IMAGING METHOD CAPABLE OF QUICKLY SETTING PHOTOGRAPHING CONDITION, AND NON-TRANSITORY STORAGE MEDIUM

(71) Applicant: CASIO COMPUTER CO., LTD., Shibuya-ku, Tokyo (JP)

(72) Inventor: Toru Nakakusu, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 3 days.

(21) Appl. No.: 14/073,328

(22) Filed: Nov. 6, 2013

(65) Prior Publication Data

US 2014/0169778 A1   Jun. 19, 2014

(30) Foreign Application Priority Data

Dec. 19, 2012   (JP) .................................. 2012-276673

(51) Int. Cl.
| | |
|---|---|
| *H04N 1/00* | (2006.01) |
| *H04N 5/232* | (2006.01) |
| *H04N 5/235* | (2006.01) |

(52) U.S. Cl.
CPC ............. *H04N 5/232* (2013.01); *H04N 5/2351* (2013.01); *H04N 5/2352* (2013.01); *H04N 5/23212* (2013.01); *H04N 5/23296* (2013.01)

(58) Field of Classification Search
CPC .......... G02B 7/102; G02B 7/282; G02B 7/28; G02B 7/10; G02B 7/36; G03B 13/36; G03B 13/31; H04N 5/23212

USPC ......... 396/82, 72, 81, 77; 348/333.01, 333.02
See application file for complete search history.

(56) References Cited

U.S. PATENT DOCUMENTS

| | | | | |
|---|---|---|---|---|
| 5,159,364 | A | * 10/1992 | Yanagisawa et al. | ........... 396/76 |
| 6,522,838 | B1 | 2/2003 | Natsume et al. | |
| 2007/0153111 | A1 | 7/2007 | Kato | |
| 2009/0237548 | A1 | * 9/2009 | Watanabe et al. | ........ 348/333.02 |

FOREIGN PATENT DOCUMENTS

| | | |
|---|---|---|
| JP | 10197777 A | 7/1998 |
| JP | 2000-299814 A | 10/2000 |
| JP | 2001074999 A | 3/2001 |
| JP | 2001160912 A | 6/2001 |
| JP | 2004-184628 A | 7/2004 |
| JP | 2004-242367 A | 8/2004 |

(Continued)

OTHER PUBLICATIONS

Japanese Office Action dated Dec. 18, 2014, issued in counterpart Japanese Application No. 2012-276673.

(Continued)

*Primary Examiner* — Rochelle-Ann J Blackman
(74) *Attorney, Agent, or Firm* — Holtz, Holtz, Goodman & Chick PC

(57) ABSTRACT

In the present invention, in a state where a photographing parameter of an imaging section (for example, the focal length of a zoom lens) has been set within the range between a first value (for example, a wide angle end of 18 mm) and a second value (for example, a telephoto end of 140 mm), and a reference value (for example, 28 mm) for the photographing parameter has been set within the range between the first value and the second value, a control section changes the set parameter to the reference value.

17 Claims, 6 Drawing Sheets

(56) References Cited

FOREIGN PATENT DOCUMENTS

| | | |
|---|---|---|
| JP | 2007178453 A | 7/2007 |
| JP | 2007184733 A | 7/2007 |
| JP | 2011035918 A | 2/2011 |
| KR | 1020050062253 A | 6/2005 |
| KR | 1020050068004 A | 7/2005 |
| KR | 1020100098116 A | 9/2010 |

OTHER PUBLICATIONS

Korean Office Action dated Dec. 15, 2014 issued in counterpart Korean Application No. 10-2013-0155036.

Japanese Office Action dated Aug. 29, 2014 issued in counterpart Japanese Application No. 2012-276673.

* cited by examiner

FIG. 2A

3C REFERENCE VALUE TABLE

| PHOTOGRAPH-ING MODE TYPE/FIXED VALUE | REFERENCE VALUE OF PHOTOGRAPHING PARAMETERS | | |
|---|---|---|---|
| | REFERENCE ZOOM VALUE FOR 18 mm TO 140 mm | REFERENCE FOCUS VALUE FOR 10 cm TO ∞ | REFERENCE APERTURE VALUE FOR F2.8 TO F16 |
| LANDSCAPE | 18mm | ∞ | F8 |
| FLOWER | 28mm | 1m | OPEN |
| PEOPLE | 50mm | 3m | F5.6 |
| SELF PHOTOGRAPH-ING | 28mm | 1m | F5.6 |
| GROUP PHOTOGRAPH | 18mm | 5m | F8 |
| ⋮ | ⋮ | ⋮ | ⋮ |
| FIXED VALUE | 28mm | 1m | F5.6 |

| SET FLAG FOR REFERENCE VALUE SELECTION | SELECTION TARGET |
|---|---|
| 0 | SELECT FIXED VALUES |
| 1 | SELECT REFERENCE VALUES CORRESPONDING TO PHOTOGRAPHING MODE TYPE SET ACCORDING TO USER OPERATION |
| 2 | SELECT REFERENCE VALUES CORRESPONDING TO PHOTOGRAPHING MODE TYPE AUTOMATICALLY SET BY JUDGING SCENE TO BE PHOTOGRAPHED |

WHEN 28/18 IS REPRESENTED BY
NEGATIVE VALUE

WHEN 140/28 IS REPRESENTED
BY POSITIVE VALUE

WHEN 18/28 IS DISPLAYED IN
DECIMAL REPRESENTATION

IMAGING APPARATUS AND IMAGING METHOD CAPABLE OF QUICKLY SETTING PHOTOGRAPHING CONDITION, AND NON-TRANSITORY STORAGE MEDIUM

CROSS-REFERENCE TO RELATED APPLICATION

This application is based upon and claims the benefit of priority from the prior Japanese Patent Application No. 2012-276673, filed Dec. 19, 2012, the entire contents of which are incorporated herein by reference.

BACKGROUND OF THE INVENTION

1. Field of the Invention

The present invention relates to an imaging apparatus and an imaging method for performing a photographing operation with a specified photographing condition, and a non-transitory storage medium.

2. Description of the Related Art

Conventionally, for zoom-lens-equipped digital compact cameras (imaging apparatuses), there are a number of lenses having 28 mm to 35 mm (in terms of a film size of 35 mm, the same applies hereinafter) as a wide angle end (Wide end) side, and their initial positions when photographing is started are generally on the wide angle end side (wide angle side). On the other hand, in recent years, lenses have a wider angle. This wider angle is desirable for users because photographing use is widened. However, frequently used zoom positions are often near the telephoto end (Tele end) rather than the wide angle side. In a case where a zoom lens has been set on the wide angle side when photographing is started, an operation of changing the position from the wide angle side to a position near the telephoto end side is required. This increases the operation amount of a zoom lever, which makes the operation burdensome and by which a photo opportunity may be missed.

In Japanese Patent Application Laid-Open (Kokai) Publication No. 2004-184628, a technique is disclosed to address these problems in which a zoom lens is set between the wide angle end and the telephoto end when power is turned on.

SUMMARY OF THE INVENTION

In accordance with one aspect of the present invention, there is provided an imaging apparatus which performs a photographing operation with a specified photographing condition, comprising: an operation section which is positioned in a predetermined area on the imaging apparatus; a photographing parameter adjusting section which arbitrarily adjusts a predetermined photographing parameter included in the photographing condition, within a range between a first value and a second value; a reference value defining section which defines a reference value for the photographing parameter within a range between the first value and the second value excluding the first value and the second value; and a changing section which changes the photographing parameter arbitrarily adjusted by the photographing parameter adjusting section to the reference value, when one operation is performed on the operation section.

In accordance with another aspect of the present invention, there is provided an imaging method comprising: a step of arbitrarily adjusting a predetermined photographing parameter included in a specified photographing condition, within a range between a first value and a second value; and a step of changing, when a reference value for the photographing parameter has been defined within a range between the first value and the second value excluding the first value and the second value, the arbitrarily adjusted photographing parameter to the reference value in response to one operation performed on an operation section.

In accordance with another aspect of the present invention, there is provided a non-transitory computer-readable storage medium having stored thereon a program that is executable by a computer, the program being executable by the computer to perform functions comprising: processing for arbitrarily adjusting a predetermined photographing parameter included in a specified photographing condition, within a range between a first value and a second value; processing for defining a reference value for the photographing parameter within a range between the first value and the second value excluding the first value and the second value; and processing for changing the arbitrarily adjusted photographing parameter to the reference value when one operation is performed on an operation section.

In accordance with another aspect of the present invention, there is provided an imaging apparatus which performs zoom photographing with a focal length of a zoom lens as a photographing condition, comprising: a zoom setting section which sets the focal length of the zoom lens within a range between a wide angle end and a telephoto end; a reference value defining section which defines a focal length shifted from the wide angle end by a predetermined amount to a telephoto side as a reference value that is used when a zoom magnification is calculated; and a zoom magnification display section which displays, as the zoom magnification, a ratio between the focal length set by the zoom setting section and the focal length serving as the reference value.

In accordance with another aspect of the present invention, there is provided an imaging method comprising: a step of setting a focal length of a zoom lens within a range between a wide angle end and a telephoto end; and a step of defining a focal length shifted from the wide angle end by a predetermined amount to a telephoto side as a reference value that is used when a zoom magnification is calculated, and displaying a ratio between the set focal length and the focal length serving as the reference value, as the zoom magnification.

In accordance with another aspect of the present invention, there is provided a non-transitory computer-readable storage medium having stored thereon a program that is executable by a computer, the program being executable by the computer to perform functions comprising: processing for setting a focal length of a zoom lens within a range between a wide angle end and a telephoto end; and processing for defining a focal length shifted from the wide angle end by a predetermined amount to a telephoto side as a reference value that is used when a zoom magnification is calculated, and displaying a ratio between the set focal length and the focal length serving as the reference value, as the zoom magnification.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2A is a diagram for describing a reference value table 3C;

FIG. 2B is a diagram for describing a set flag F for reference value selection;

FIG. 3 is a flowchart for describing the operation of the digital camera (the characteristic operation of the present embodiment) that is started when power is turned on;

DETAILED DESCRIPTION OF THE PREFERRED EMBODIMENTS

An embodiment of the present invention is described with reference to FIG. 1 to FIG. 5B.

Figure 1:
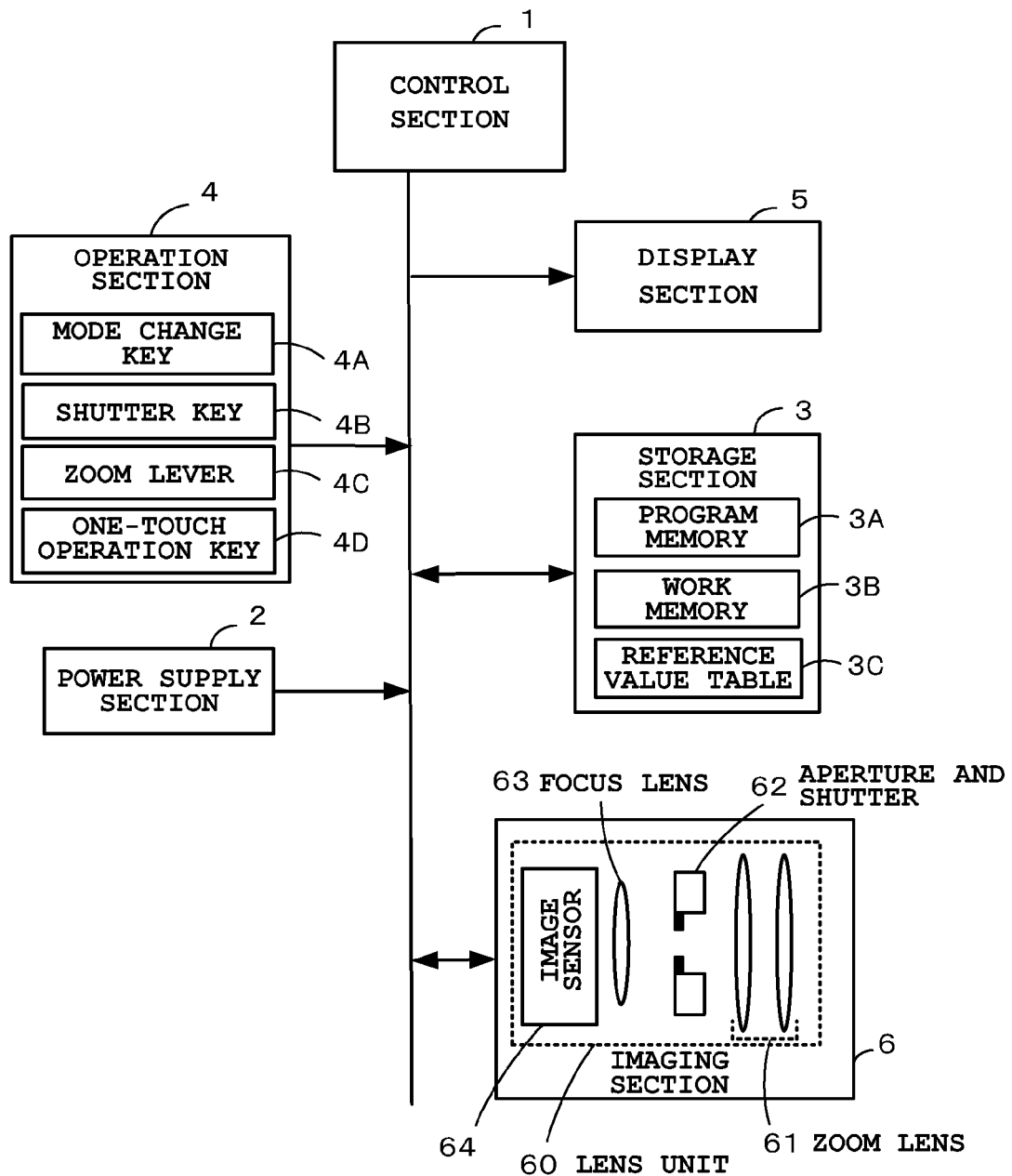
FIG. 1 is a block diagram depicting basic components of a digital camera (imaging apparatus)

FIG. 1 is a block diagram depicting basic components of a digital camera (imaging apparatus).

A digital camera in FIG. 1 is a digital compact camera capable of capturing not only a still image but also a moving image, and has basic functions such as an imaging function, a timer function, and a zoom function as well as a function (best-shot photographing function) for analyzing a live view image to recognize a current scene to be photographed (for example, landscape or people to be photographed) and setting various photographing conditions (photographing parameters) such as a shutter speed, an aperture value, and white balance that are optimum for the scene to be photographed.

A control section 1 in FIG. 1 operates with power supplied from a power supply section (a secondary battery) 2, and controls the entire operation of the digital camera according to various programs in a storage section 3. This control section 1 is provided with a CPU (Central Processing Unit) and a memory not shown. The storage section 3 is structured to include, for example, a ROM (Read Only Memory) or a flash memory, and has a program memory 3A having stored therein a program and various applications for achieving the present embodiment according to an operation procedure depicted in FIG. 3 and FIG. 4 described further below, a work memory 3B that temporarily stores various information (for example, a flag) required for the operation of the digital camera, and a reference value table 3C described further below. The storage section 3 may be structured to include, for example, a removable portable memory (recording medium) such as an SD (Secure Digital) card or an IC (Integrated Circuit) card, or may be structured to include, although not shown, a storage area on a predetermined server device side in a case where the digital camera is connected to a network by a communication function.

An operation section 4 in FIG. 1 includes various keys as push-button-type keys. For example, the operation section 4 includes a mode change key 4A for making an instruction for switching between a photographing mode for setting a photographable state and a replay mode for replaying a photographed image, a shutter key 4B for instructing to start photographing, a zoom lever 4C for adjusting a viewing angle (zoom), a one-touch operation key 4D for changing a predetermined photographing parameter (photographing condition) to a predetermined reference value by one operation, and various keys (omitted in the drawing) for setting photographing conditions such as a shutter speed, an aperture value, and exposure. The control section 1 performs processing according to an input operation signal outputted from the operation section 4 in response to the operation of an operation key.

The above-described one-touch operation key 4D is arranged on an area where the camera is operable with the right thumb when it is held, such as near the shutter key 4B on the back surface of the camera body. This one-touch operation key 4D is a key for instructing to change a currently set photographing parameter with a one-push operation (one pushing operation). A display section 5 in FIG. 1 is a high-definition liquid crystal display or an organic EL (Electro Luminescence) display, and serves as a monitor screen for displaying an image to be photographed (live view image) or a replay screen for replaying a photographed image.

An imaging section 6 in FIG. 1 is structured to have a lens unit 60 in addition to various sensors, an analog processing section, and a digital processing section omitted in the drawing, and can capture not only a still image and but also a moving image. A photoelectrically converted image signal (analog-value signal) is subjected to color separation and gain adjustment for each RGB color component, and then converted to digital-value data. This digitally converted image data is subjected to color interpolation (demosaic processing) for full-color display on the display section 5. The lens unit 60 has a zoom lens 61, an aperture and shutter 62, a focus lens 63, and an image sensor 64 such as a CCD (Charge Coupled Device) or a CMOS (Complementary Metal Oxide Semiconductor).

The imaging section 6 drives the zoom lens 61, the aperture and shutter 62, and the focus lens 63 in accordance with a control signal from the control section 1, and thereby controls zoom adjustment, focus adjustment, exposure adjustment, and the start/end of photographing, or performs optical zoom processing, focus processing, aperture adjustment processing, white balance processing, etc. In this case, the imaging section 6 drives the mechanism of the zoom lens 61, the aperture and shutter 62, and the focus lens 63 serving as optical-system components for photographing according to photographing parameters (a zoom value, a focus value, and an aperture value), and thereby performs optical zoom processing, focus processing, and aperture adjustment processing. In the present embodiment, a lens of 18 mm (wide angle end) to 140 mm (telephoto end) with a magnifying power of 7.8 times is used as the zoom lens 61. However, the specifications thereof are not limited to this example.

FIG. 2A is a diagram for describing the reference value table 3C.

The reference value table 3C is a table having stored therein reference values for predetermined photographing parameters (a zoom value, a focus value, and an aperture value). This reference value table 3C is structured to store reference values which vary according to the type of photographing mode by scene (reference values by photographing mode type) among a plurality of photographing mode types in the photographing mode, and constant reference values (fixed values) that are constant irrespective of the type of photographing mode. The zoom value serving as a photographing parameter (the focal length of the zoom lens 61) is set within a range between a first value (the focal length of the wide angle end) and a second value (the focal length of the telephoto end). In the example depicted in the drawing, the range is between "18 mm (wide angle end)" to "140 mm (telephoto end)". The focus value is set within a range between "10 cm (close-up)" to "∞" (infinity), and the aperture value is set within a range between a lower-limit value (F2.8) to an upper-limit value (F16).

The reference values which vary according to the type of photographing mode by scene (reference values by photographing mode type) are, for example, a reference zoom value of "18 mm", a reference focus value of "∞", and a reference aperture value of "F8" for a landscape photographing scene. For a flower photographing scene, a reference zoom value of "28 mm", a reference focus value of "1 m", and a reference aperture value of "open" are set. For a group photograph scene, a reference zoom value of "18 mm", a reference focus value of "5 m", and a reference aperture value of "F8" are set. As for the constant reference values (fixed values), a reference zoom value of "28 mm", a reference focus value of "1 m", and a reference aperture value of "F5.6" are set.

The contents of the reference value table 3C are arbitrarily set by a user operation. The user sets arbitrary reference values according to his or her preferences, or sets values that are most often used in general photographing other than super-wide-angle and ultra-telephoto photographing. Also, it is possible to change reference values at the time of shipping from the manufacturer (at the time of initial settings) to desired reference values or return the changed values to the reference values at the time of initial settings. When one operation is performed on a predetermined operation section, the control section 1 changes currently set photographing parameters (a zoom value, a focus value, and a aperture value) to their reference values. Here, "when one operation is performed on a predetermined operation section" means that a change operation for changing photographing parameters to their reference values has been performed, or in other words, the one-touch operation key 4D has been operated. When the one-touch operation key 4D is operated, the control section 1 performs processing for referring to the reference value table 3C and changing currently set photographing parameters to their reference values.

FIG. 2B is a diagram for describing a set flag F for reference value selection.

A set flag F for reference value selection is a flag indicating whether to select the reference values by photographing mode type or select the constant reference values (fixed values) irrespective of the type of photographing mode when reference values are selectively read out from the reference value table 3C. That is, when the set flag F for reference value selection indicates a value of "0", the fixed values are to be selected as reference values. When the set flag F indicates a value of "1" or "2", the reference values by photographing mode type are to be selected.

The above-described case where the set flag F for reference value selection is a value of "1" indicates that, when a photographing mode type arbitrarily selected by a user operation is set among the plurality of photographing mode types in the photographing mode, reference values for this photographing mode type are to be selected. Also, the above-described case where the set flag F for reference value selection is a value of "2" indicates that, when a photographing mode type of a scene selected by analyzing a live view image and recognizing a current scene to be photographed is set, reference values for this photographing mode type are to be selected. The set flag F for reference value selection can be arbitrarily set in advance by a user operation. Accordingly, the user sets the set flag F in advance before photographing.

Next, the operation concept of the digital camera in the present embodiment is described with reference to flowcharts depicted in FIG. 3 and FIG. 4. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium.

Figure 3:
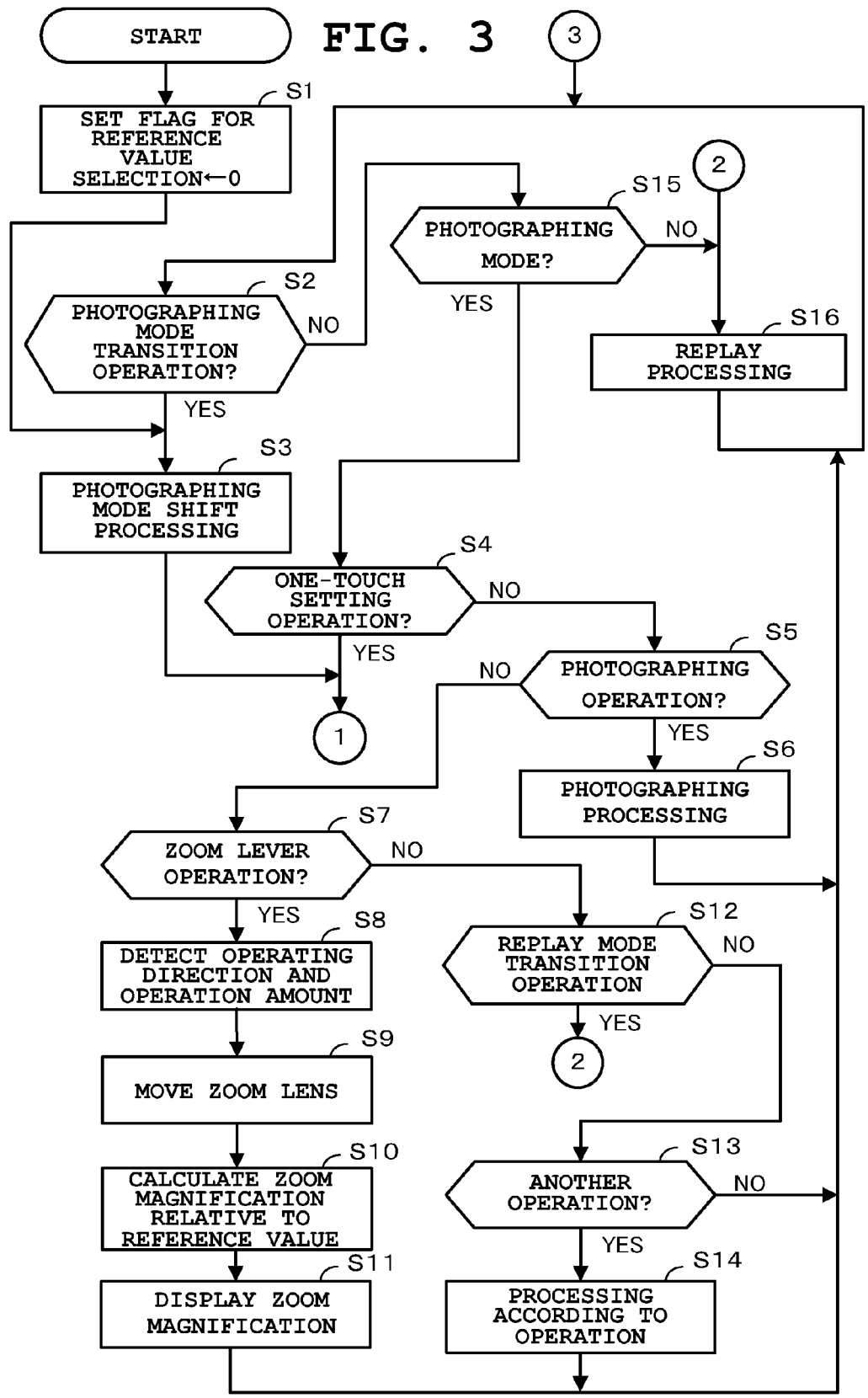
Figure 4:
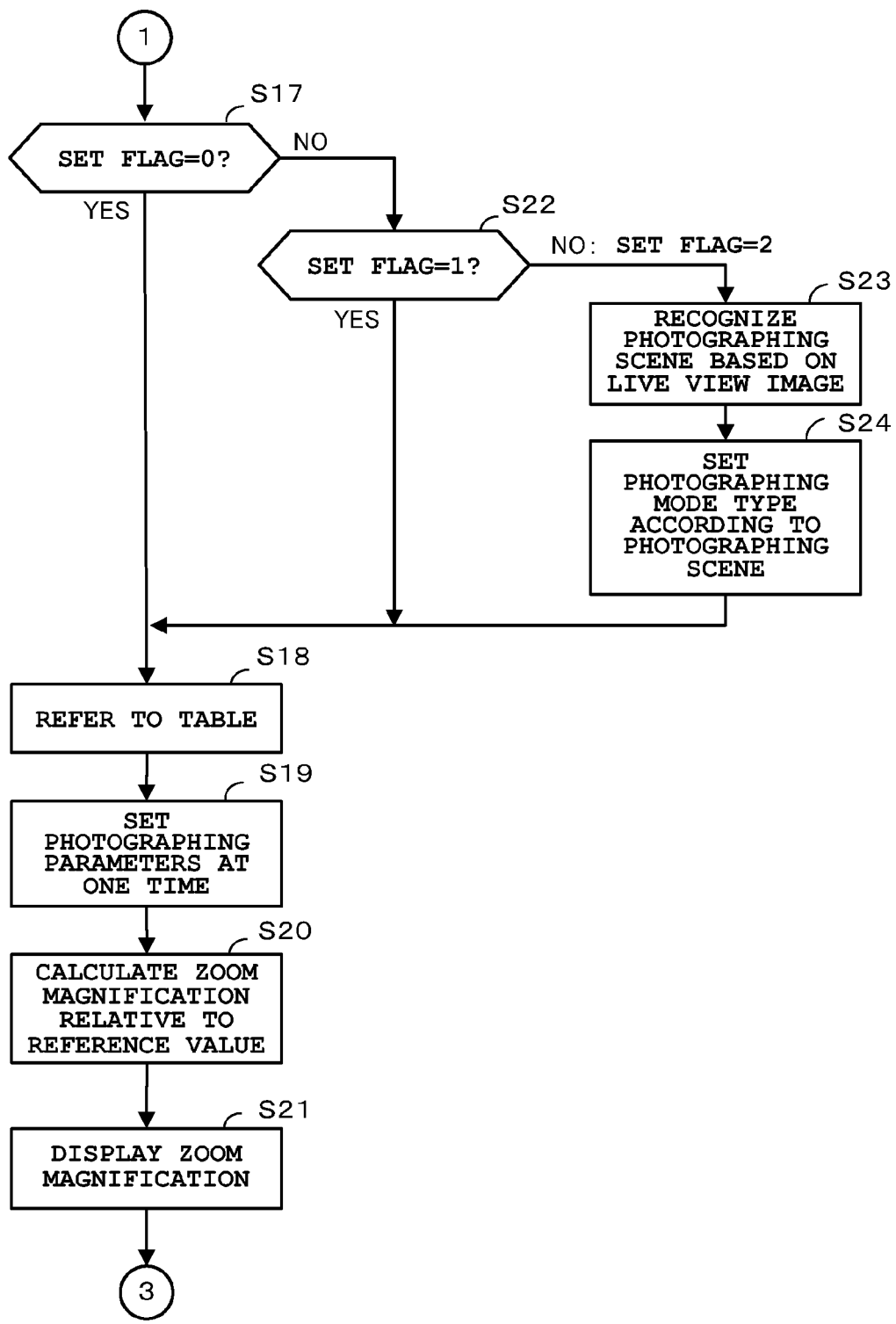
FIG. 4 is a flowchart following the operation in FIG. 3.

FIG. 3 and FIG. 4 each depict a flowchart for describing the operation of the digital camera (the characteristic operation of the present embodiment) that is started when power is turned on.

First, as initialization processing at power-on, the control section 1 performs processing for clearing a predetermined memory and processing for setting the value of set flag F for reference value selection to "0" (Step S1 of FIG. 3), and performs photographing mode shift processing for activating the imaging section 6 to shift the current state to a photographable state (Step S3). As a result of this configuration, the current mode is shifted to an imaging mode in response to a power-on operation. Then, the control section 1 proceeds to Step S17 of FIG. 4, and refers to the set flag F for reference value selection to judge whether the value indicates "0".

Here, at power-on, the value of the set flag F for reference value selection is "0" indicating that fixed values are to be selected as reference values (YES at Step S17), the control section 1 proceeds to the next Step S18, and performs processing for referring to the reference value table 3C to read out "28 mm", "1 mm", and "F5.6" as reference values (a zoom value, a focus value, and an aperture value) corresponding to the "fixed values" and setting these reference values (fixed values) at one time (Step S19). As a result, the zoom value, the focus value, and the aperture value are collectively set at their reference values (fixed values). That is, when the zoom value is to be set, since its reference value is "28 mm", zoom adjustment is made by moving the zoom lens 61 such that the focal length of the zoom lens 61 is "28 mm". Similarly, focus adjustment is made by driving the focus lens 63 such that the focus value is its reference value ("1 m") and exposure adjustment is made by driving the aperture 62 such that the aperture value is its reference value ("5.6").

Then, a zoom magnification is calculated based on these reference values (Step S20), and the zoom magnification is displayed on a live view screen of the display section 5 (Step S21). In this case, since the lens of 18 mm (wide angle end) to 140 mm (telephoto end) with a magnifying power of 7.8 times is used as the zoom lens 61 and its reference value is "28 mm", a zoom magnification of "×1.0" calculated by a computation of "28/28" is displayed on the live view screen.

Next, the control section 1 returns to the flow of FIG. 3, and judges whether a photographing mode shift operation has been performed (whether an operation of shifting the current mode to the photographing mode has been performed with the mode change key 4A) (Step S2) and whether the current mode is the photographing mode (Step S15). Here, if the current mode is still the photographing mode (YES at Step S15), the control section 1 judges whether the one-touch operation key 4D has been operated in this photographing mode (Step S4), judges whether a photographing operation has been performed (whether the shutter key 4B has been operated) (Step S5), judges whether the zoom lever 4c has been operated (Step S7), judges whether a replay mode transition operation has been performed (Step S12), and judges whether another operation has been performed (Step S13).

When judged that another operation has been performed (YES at Step S13), the control section 1 performs processing according to this operation (Step S14). For example, if an operation of manually setting a shutter speed, a focus value, an aperture value, etc., has been performed, the control section 1 performs processing for setting photographing parameters such as a shutter speed, a focus value, and an aperture value as processing according to this operation. Also, if a change instructing operation has been performed to change the value of the set flag F for reference value selection as another operation, the control section 1 performs processing for changing the value of the set flag F for reference value selection according to this operation. If an operation for instructing to set arbitrary reference values has been performed as another operation, the control section 1 performs processing for arbitrarily setting the reference values (the zoom value, the focus value, and the aperture value) of the photographing parameters in the reference value table 3C.

At Step S4, when the one-touch operation key 4D has been operated in the photographing mode (YES at Step S4), the control section 1 proceeds to the flow of FIG. 4, and judges whether the set flag F for reference value selection indicates "0" (Step S17) or "1" (Step S22). This set flag F for reference value selection is initialized to "0" at power-on, and then can be changed to any value by processing according to the operation described above (Step S14 of FIG. 3). When the value is still "0" (YES at Step S17), Steps S18 and S19 described above are performed, and as a result the reference values for the photographing parameters (the zoom value, the focus value, and the aperture value) remain at the fixed values.

When the set flag F for reference value selection indicates a value of "1" (YES at Step S22), the control section 1 performs processing for referring to the reference value table 3C to select reference values for a photographing mode type arbitrarily set in advance by a user operation (currently set photographing mode type by scene), reading out the reference values for the photographing parameters (the zoom value, the focus value, and the aperture value) associated with this photographing mode type by scene, and setting to these reference values at one time (Step S19). For example, for a landscape photographing scene, a reference zoom value of "18 mm", a reference focus value of "∞", and a reference aperture value of "F8" are set. Then, the control section 1 performs processing for calculating and displaying a zoom magnification corresponding to this reference value (Steps S20 and S21). In this case, a zoom magnification of "×1.0" calculated by a computation of "18/18" is displayed on the live view screen.

When the set flag F for reference value selection is not "1" (NO at Step S22), the control section 1 judges the value as "2", and proceeds to Step S23. At Step S23, the control section 1 recognizes a photographing scene by analyzing a live view image, and then sets a photographing mode type for this scene (Step S24). This recognition of a photographing scene is performed by using known art. Hereafter, as with the case described above, the control section 1 performs processing for referring to the reference value table 3C to select reference values for this photographing mode type by scene (Step S18), reading out the reference values for the photographing parameters (the zoom value, the focus value, and the aperture value) associated with the photographing mode type by scene and setting to these reference values at one time (Step S19). Then, the control section 1 performs processing for calculating and displaying a zoom magnification corresponding to this reference value (Steps S20 and S21). For example, if the reference value is 50 mm, a zoom magnification of "×1.0" calculated by a computation of "50/50" is displayed on the live view screen.

At Step S7, when the zoom lever 4C has been operated in the photographing mode (YES at Step S7), the control section 1 detects a direction in which the zoom lever 4C has been operated (a clockwise direction or a counterclockwise direction) and its operation amount (Step S8), and make zoom adjustment by moving the zoom lens 61 according to the operating direction and the operation amount (Step S9). In this case, since the photographing parameter (the zoom value) has been set to the constant reference value (fixed value) at power-on, the user is only required to operate the zoom lever 4C in a plus direction or a minus direction with the constant reference value (fixed value) as a starting point to set a desired zoom value. Next, the control section 1 calculates a zoom magnification relative to the reference value (Step S10), and displays the zoom magnification relative to the reference value on the live view screen of the display section 5 (Step S11).

Figure 5A:
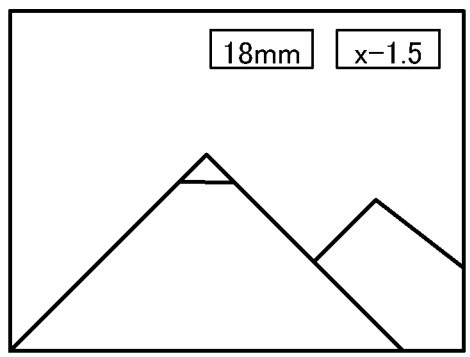
FIG. 5A and FIG. 5B each depict a state where a zoom magnification relative to a reference value has been displayed on a live view screen.
Figure 5B:
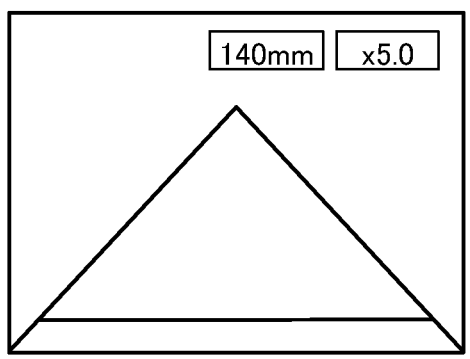

FIG. 5A and FIG. 5B each depict the state where a zoom magnification relative to a reference value has been displayed on a live view screen.

FIG. 5A is a diagram depicting a case where the zoom value has been changed to its reference value of "28 mm" by an operation of the zoom lever 4C. In a predetermined area on the live view screen, a zoom magnification of "×−1.5" (minus representation) calculated by a computation of 28/18 is displayed. Also, as the focal length of the wide angle end of the zoom lens 61, "18 mm" is displayed. FIG. 5B depicts a case where a telephoto end has been set to "140 mm" by an operation of the zoom lever 4C. In a predetermined area on the live view screen, a zoom magnification of "×5.0" (plus representation) calculated by a computation of 140/28 is displayed. Also, as the focal length of the telephoto end of the zoom lens 61, "140 mm" is displayed.

In this state where the various photographing parameters have been set to desired values, when the shutter key 4B is operated to instructs to start photographing (YES at Step S5 of FIG. 3), the control section 1 performs photographing processing for obtaining, from the imaging section 6, an image photographed with the photographing parameters as photographing conditions, compressing the image, and recording and storing the image (Step S6). Then, the control section 1 returns to Step S2 described above. At Step S12, when the mode change key 4A has been operated in the photographing mode and thereby a replay mode transition operation has been performed (YES at Step S12), the control section 1 proceeds to Step S16, and performs processing according to an operation in a replay mode (such as replay, stop, or fast-forward). Then, the control section proceeds to Step S2. When a photographing mode transition operation is performed in this replay mode (YES at Step S2), the control section 1 performs photographing mode shift processing (Step S3) and proceeds to the flow of FIG. 4. Hereafter, the control section 1 repeats the operations described above.

As described above, in the present embodiment, when one operation is performed on a predetermined operation section with photographing parameters for the imaging section 6 being set in the range between the first value and the second value, the control section 1 changes the set parameters to their reference values. As a result of this configuration, an operation for setting photographing parameters can be performed with their reference values as starting points, the photographing parameters can be quickly set, the user's burden can be reduced, and reliable photographing can be achieved without missing a photo opportunity. For example, in a case where the photographing parameter is a zoom value, in consideration of the fact that photographing with a focal length shifted from the wide angle end by a predetermined amount to the telephoto side is often used more than super-wide-angle photographing near the wide angle end or ultra-telephoto photographing near the telephoto end, if that position (the focal length) is taken as a reference value, an operation of setting a photographing parameter by taking the reference value as a starting point can be performed. Therefore, when the zoom lever 4C is operated in a plus direction or a minus direction to set a desired value, if the desired value is equal to or near the reference value, the operation of the zoom lever 4C is not required or a slight operation is enough. Thus, quick zoom setting can be achieved.

Also, when the one-touch operation key 4D is operated, photographing parameters are changed to their reference values. As a result of this configuration, only by one push (only by one operation being performed), photographing parameters can be changed to their reference values at any time and, with each reference value as a starting point, the photographing parameters (the zoom value, the focus value, and the aperture value) can be quickly set.

Moreover, these photographing parameters are changed to their reference values when a power-on operation is performed or when a photographing mode transition operation is performed. As a result of this configuration, immediately after the above-described operation, a photographing parameter setting operation can be performed with each reference value as a starting point.

Furthermore, as a result of the configuration where reference values for photographing parameters can be set in the reference value table 3C, the reference values for the photographing parameters are not fixed values and can be set to values corresponding to a photographing situation or the like.

Still further, as a result of the configuration where arbitrary reference values can be set by a user operation, reference values can be arbitrarily set according to the usability of each user.

Yet still further, when an arbitrary photographing mode type is selected and set by a user operation from among a plurality of photographing mode types in the photographing mode, reference values corresponding to this photographing mode type are set. As a result of this configuration, photographing parameters can be changed to reference values that are appropriate for a photographing mode type selected by the user.

Yet still further, when a scene to be photographed is recognized by a live view image being analyzed, and a photographing mode type for this scene is selected and set, reference values corresponding to this photographing mode type are set. As a result of this configuration, photographing parameters can be changed to appropriate reference values according to a photographic subject or a photographing situation.

Yet still further, the zoom lens 61, the aperture and shutter 62, the focus lens 63 are mechanically driven according to changes in reference values. As a result of this configuration, even in mechanical driving for which the change of photographing conditions requires time, photographing parameters can be quickly and appropriately changed to desired values with the position of each reference value as a starting point.

Yet still further, the above-described photographing parameters are a combination of a zoom value, a focus value, and an aperture value, and these photographing parameters (the zoom value, the focus value, and the aperture value) are changed to their reference values. As a result of this configuration, a zoom value, a focus value, and an aperture value can be collectively changed, whereby the operability can be further enhanced.

Yet still further, instead of being changed for each user operation by a predetermined amount, photographing parameters are changed directly to reference values by one operation of the one-touch operation key 4D. Therefore, the usability is enhanced, whereby the improvement of the operability can be expected.

Yet still further, in a case where a focal length shifted from the wide angle end of the zoom lens 61 by a predetermined amount to a telephoto side is defined as a reference value in calculating a zoom magnification, a ratio between a focal length set in a range between the wide angle end and the telephoto end and the focal length as the reference value is displayed as a zoom magnification. As a result of this configuration, zoom magnification display can be achieved in consideration of the fact that photographing with a focal length shifted from the wide angle end by a predetermined amount to a telephoto side is used more often than super-wide-angle photographing near the wide angle end or ultra-telephoto photographing near the telephoto end. Accordingly, the photographer can easily change the zoom magnification to a larger or smaller one by taking the reference value as a starting point while checking the magnification display.

Yet still further, when the currently set focal length of the zoom lens 61 is shorter than the reference value, the zoom magnification is displayed in a display mode different from that of the case where the currently set focal length is longer than the reference value (zoom magnification in minus/plus representation). As a result of this configuration, the user can easily know a direction in which he or she needs to operate the zoom lever 4C, which helps improvement in the operability.

Figure 6:
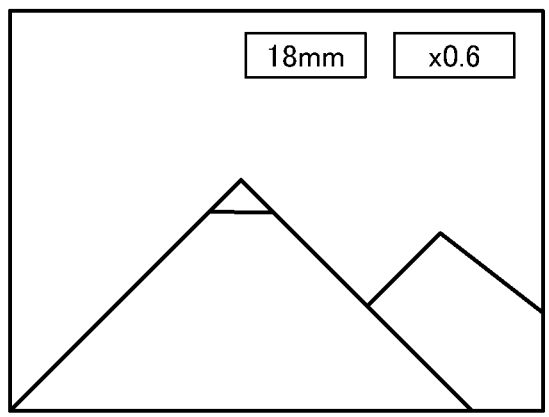
FIG. 6 is a diagram depicting a variation example of the present embodiment, in which a zoom magnification for a reference value has been displayed in decimal representation.

In the above-described embodiment, when the currently set focal length of the zoom lens 61 is shorter than a reference value, the zoom magnification is displayed in minus representation. However, the display form is not limited thereto. For example, by finding "wide angle end/reference value=0.6", the zoom magnification may be displayed in decimal representation, as depicted in FIG. 6. Alternatively, different colors or different deformed shapes may be used between the case where the focal length of the zoom lens 61 is shorter than a reference value and the case where the focal length is longer than the reference value. As such, any display mode can be used as long as both cases are easily identifiable.

Also, in the above-described embodiment, a plurality of photographing parameters (a zoom value, a focus value, and an aperture value) are collectively changed to their reference values. However, the zoom value, the focus value, and the aperture value may be separately and individually changed. For example, by a configuration being adopted in which one of or a combination of two or more of the zoom value, the focus value, and the aperture value can be specified as a change target, only the specified photographing parameter(s) can be changed to its (their) reference value(s). As a result of this configuration, for example, only the zoom value can be changed or the zoom value and the focus value can be collectively changed according to the user's specification.

Moreover, in the above-described embodiment, mechanical control over a plurality of photographing parameters (a zoom value, a focus value, and an aperture value) is exemplarily described. However, the present embodiment is not limited thereto, and can be similarly applied to the case where software control over ISO speed and the like is performed.

Furthermore, in the above-described embodiment, the one-touch operation key 4D is provided as a key for instructing to change photographing parameters. However, this dedicated button need not necessarily be provided, and a half-shutter operation of the shutter key 4B for shifting the current state to a photographing standby state may be used as an operation for changing photographing parameters.

Still further, in the above-described embodiment, the present invention is applied to a digital compact camera as an imaging apparatus. However, the present invention may be applied to digital single-lens reflex cameras, camera-equipped personal computers, PDAs (personal digital assistants), smartphones, tablet terminal devices, or electronic game machines.

Still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An imaging apparatus which performs a photographing operation with a specified photographing condition, the imaging apparatus comprising:
   a first operation section which is positioned in a predetermined area on the imaging apparatus;
   a second operation section which arbitrarily adjusts a predetermined photographing parameter included in the photographing condition, within a range between a first value and a second value;
   a selecting section which selects a photographing mode type from among a plurality of photographing mode types included in a photographing mode, wherein the plurality of photographing mode types respectively correspond to different photographing targets, and wherein a different photographing condition is set for each of the different photographing targets;
   a reference value setting section which sets and stores a reference value of the photographing parameter for each of the plurality of photographing mode types within the range between the first value and the second value; and
   a changing section which, regardless of a value of the photographing parameter arbitrarily adjusted by the second operation section, reads out the reference value corresponding to the photographing mode type selected by the selecting section from among the reference values set and stored by the reference value setting section, and changes the photographing parameter to the read-out reference value, when one operation is performed on the first operation section.

2. The imaging apparatus according to claim 1, wherein the first operation section is a dedicated button for changing the photographing parameter to the reference value corresponding to the selected photographing mode type by the changing section.

3. The imaging apparatus according to claim 1, wherein a half-shutter operation of a shutter button for shifting a current state to a photographing standby state is used as the first operation section in order to change the photographing parameter to the reference value corresponding to the selected photographing mode type by the changing section.

4. The imaging apparatus according to claim 1, wherein the changing section changes the photographing parameter to the reference value corresponding to the selected photographing mode type when a power-on operation or a photographing mode shift operation for shifting a current mode to the photographing mode where the photographing operation is executable is performed.

5. The imaging apparatus according to claim 1, wherein the reference value setting section stores the reference value for each of the plurality of photographing mode types arbitrarily set by a user operation.

6. The imaging apparatus according to claim 1, further comprising an analyzing section which analyzes a live view image;
wherein the selecting section selects the photographing mode type from among the plurality of photographing mode types in the photographing mode, according to a result of the analysis by the analyzing section,
wherein the changing section changes, when an operation for changing the photographing parameter to the reference value is performed, the photographing parameter to the reference value set corresponding to a current photographing mode type selected by the selecting section.

7. The imaging apparatus according to claim 1, further comprising:
   a driving section which drives an optical-system component for photographing,
   wherein the changing section controls the driving section to drive the optical-system component in response to change of the photographing parameter to the reference value corresponding to the selected photographing mode type.

8. The imaging apparatus according to claim 7, wherein the predetermined photographing parameter is one of or a combination of a zoom value, a focus value, and an aperture value.

9. The imaging apparatus according to claim 1, wherein the second operation section changes the photographing parameter by a predetermined amount for each user operation, and
   wherein the changing section changes the photographing parameter directly to the reference value corresponding to the selected photographing mode type by one user operation.

10. The imaging apparatus according to claim 1, wherein the first operation section is arranged near an operation section for instructing to start photographing.

11. The imaging apparatus according to claim 1, wherein said one operation is performable on the first operation section both before and after an operation of the second operation section.

12. An imaging apparatus which performs zoom photographing with a focal length of a zoom lens as a photographing condition, the imaging apparatus comprising:
   a zoom setting section which sets the focal length of the zoom lens within a range between a wide angle end and a telephoto end;
   a reference value defining section which defines a focal length shifted from the wide angle end by a predetermined amount to a telephoto side as a reference value that is used when a zoom magnification is calculated; and
   a zoom magnification display section which displays, as a numerical value of the zoom magnification, a ratio between the focal length set by the zoom setting section and the focal length serving as the reference value defined by the reference value defining section.

13. The imaging apparatus according to claim 12, wherein the zoom magnification display section displays, when the focal length set by the zoom setting section is shorter than the reference value defined by the reference value defining section, the ratio in a display mode different from a display mode that is used when the focal length set by the zoom setting section is longer than the reference value defined by the reference value defining section.

14. An imaging method comprising:
   arbitrarily adjusting a predetermined photographing parameter included in a specified photographing condition, within a range between a first value and a second value;
   selecting a photographing mode type from among a plurality of photographing mode types included in a photographing mode, wherein the plurality of photographing mode types respectively correspond to different photographing targets, and wherein a different photographing condition is set for each of the different photographing targets;

setting and storing a reference value of the photographing parameter for each of the plurality of photographing mode types within the range between the first value and the second value; and regardless of a value of the arbitrarily adjusted photographing parameter, reading out the set reference value corresponding to the selected photographing mode type from among the set and stored reference values, and changing the photographing parameter to the read-out reference value, in response to one operation performed on an operation section.

15. A non-transitory computer-readable storage medium having stored thereon a program for a computer, the program being executable by the computer to perform functions comprising:

arbitrarily adjusting a predetermined photographing parameter included in a specified photographing condition, within a range between a first value and a second value;

selecting a photographing mode type from among a plurality of photographing mode types included in a photographing mode, wherein the plurality of photographing mode types respectively correspond to different photographing targets, and wherein a different photographing condition is set for each of the different photographing targets;

setting and storing a reference value of the photographing parameter for each of the plurality of photographing mode types within the range between the first value and the second value; and regardless of a value of the arbitrarily adjusted photographing parameter, reading out the set reference value corresponding to the selected photographing mode type from among the set and stored reference values, and changing the photographing parameter to the read-out reference value, when one operation is performed on an operation section.

16. An imaging method comprising:

setting a focal length of a zoom lens within a range between a wide angle end and a telephoto end;

defining a focal length shifted from the wide angle end by a predetermined amount to a telephoto side as a reference value that is used when a zoom magnification is calculated; and displaying as a numerical value of the zoom magnification, a ratio between the set focal length and the focal length serving as the defined reference value.

17. A non-transitory computer-readable storage medium having stored thereon a program for a computer, the program being executable by the computer to perform functions comprising:

setting a focal length of a zoom lens within a range between a wide angle end and a telephoto end;

defining a focal length shifted from the wide angle end by a predetermined amount to a telephoto side as a reference value that is used when a zoom magnification is calculated; and displaying as a numerical value of the zoom magnification, a ratio between the set focal length and the focal length serving as the defined reference value.

* * * * *